United States Patent Office 2,865,798
Patented Dec. 23, 1958

2,865,798
ARC WELDING FLUX COMPOSITIONS

Eric Hindson, Heaton, Newcastle-upon-Tyne, England, assignor to Fusarc Limited, a British company No Drawing. Application January 4, 1955
Serial No. 479,843

Claims priority, application Great Britain
February 4, 1954

3 Claims. (Cl. 148—26)

The present invention relates generally to welding compositions or fluxing materials designed to be placed on the work in the course of an arc welding operation in order to provide a protective blanket over the pool of molten metal which is formed during such operation.

The use of fluxing materials in this manner has been known and practiced successfully for a number of years past; the materials which are most commonly used for this purpose consisting of prefused granular fluxes which are usually metallic silicates of manganese, calcium, magnesium, or aluminum or a combination of two or more of these silicates.

It has been proposed to prepare suitable granular fluxes without prefusion of the component substances by mixing a powdery flux with a plasticizing binder so that a plastic mass is obtained which is subdivided into particles of the required size, either before or after drying.

In this method of preparation clay in major proportion, gum arabic or gum tragacanth in minor proportion, or nitro-cellulose dissolved in an organic solvent such as amyl alcohol and acetone have been suggested as plasticizing binders.

It has also been proposed to prepare a suitable granular flux by the agglomeration of dry powdery fluxing materials into free flowing granules by means of a binder constituted by sodium and/or potassium silicate, the amount of binder introduced preferably approaching the minimum required to bind the other ingredients together. In this method of preparation selected flux ingredients in finely powdered form are intermixed together with a sufficient amount of sodium and/or potassium silicate binder, containing a sufficient amount of water to be liquid. The mass is then dried at a temperature substantially below the fusion points of the ingredients, and the dried product is then reduced to a suitable particle size.

A modification of this method employs substantially anhydrous sodium and/or potassium silicates as the binding agent instead of an aqueous solution of one or both of these substances, agglomeration of the powdered flux ingredients being obtained by heating the mixture to a temperature sufficient to cause fusion of the sodium and/or potassium silicates, but below that at which interfusion of the flux ingredients occurs.

Disadvantage accrues from the use of sodium and potassium silicate for this purpose because of their affinity for water. Fluxes containing these silicates tend to attract and absorb moisture from the atmosphere, and such moisture not only affects the free-flowing qualities of the flux, but also tends to lead to porosity in the deposited weld metal.

It is the principal object of this invention to provide a flux composition free of such disadvantages.

According to the present invention, this object is achieved by a flux composition for use in arc welding which comprises finely ground fluxing materials agglomerated into free-flowing granules by a substantially anhydrous fused glaze composition.

The fused glaze composition may consist of the oxides of three or more elements in the group lithium, titanium, sodium, potassium, calcium, aluminum, boron and barium, combined with silica.

The agglomeration of the flux ingredients is attained by mixing the selected powdered flux ingredients in a dry or moist condition with a suitable proportion of the powdered glaze composition and heating the mixture to a temperature sufficiently high to cause fusion of the glaze powder, but below that at which interfusion of the flux ingredients would occur. After cooling, the resultant mass is reduced to a suitable particle size by grinding or other means.

Fluxing materials which may be employed in the preparation of a suitable flux include silicates or titanates of calicum, magnesium, aluminum, manganese, iron, barium, chromium and zirconium, titanium silicate or the components of such silicates and titanates, namely silica or titania, and the corresponding metallic oxide or oxides. Other substances which may be added to the flux are metallic substances added in small amounts as killing agents, such as ferromanganese, ferrosilicon and ferrotitanium; fluorides of calcium, sodium and aluminum; and substances designed to form an alloy with the metal resulting from the fusion of the welding wire, such as a ferromanganese, in amount greater than that necessary as a killing agent, ferro chromium, ferro molybdenum, ferro vanadium, nickel powder, or other metallic elements or alloys. Carbon may also be added in order to raise the carbon content of the weld metal, in the form of carbon powder or in the form of a metallic carbide.

A glaze composition suitable for agglomerating the mixed flux ingredients should have a relatively low fusing temperature, in the region of 500° C. to 700° C. for example, for convenience of manufacture and to avoid excessive oxidation of metallic powders present in the mixture. The glaze should also be of suitable composition to form a strong bond when fused, and should not contain substances which would have harmful effects in welding.

Examples of suitable glazes are a powdered prefused complex silicate of lithium, sodium, potassium, titanium and calcium having a fusing temperature of 650° C. and lithium, sodium, potassium, titanium, calcium, aluminum silicate having a fusing temperature of 525° C. or a sodium potassium boro-silicate having a fusing temperature of 700° C.

As an example of the invention a satisfactory welding flux composition can be obtained by mixing the following finely ground materials:

| | Parts by weight |
|---|---|
| Pyrolusite | 50–80 |
| Silica | 50–80 |
| Fluorspar | 0–15 |
| Glaze composition | 5–30 |

The powdered materials are moistened with water to facilitate mixing. After mixing, the mass is agglomerated by heating to a temperature sufficiently high to cause fusion of the glaze composition. After cooling, the agglomerated mass is reduced to a suitable particle size, e. g. 12 x 200 mesh, i. e., so that the crushed material passes through a 12 mesh screen but does not pass through a 200 mesh screen.

An advantage derived from the use of such glaze compositions is that these materials are substantially insoluble in water and have a low affinity for moisture, whereas other materials such as sodium and potassium silicates are highly soluble in water and will attract and absorb moisture from the atmosphere to a considerable degree.

The absorption of moisture in a welding composition is very undesirable as this may affect the free-flowing properties of the powder and interfere with the easy deposition of the powder upon the workpiece. The absorbed moisture has many other undesirable effects in welding as it makes available a quantity of hydrogen for solution in the weld metal, which is well known to cause porosity and blow-holes in the solidified weld or cause cracking in the weld or in the metal in the immediate vicinity of the weld. The evaporation of the moisture during welding may also cause spattering of the weld metal and interfere with the smooth progress of the welding operation by causing excessive bubbling and disturbance of the pool of molten metal and flux.

A further advantage of the use of glaze compositions as described above in place of the soluble silicates of potassium and sodium is that a greater degree of control is obtained of the total potassium and sodium oxide content of the finished welding flux. If these metals are present in the flux in too great amount, undesirable effects will result, such as the undue lengthening of the welding arc.

What is claimed is:

1. A free-flowing, anhydrous, non-deliquescent, granulated flux composition for arc welding consisting of finely-divided fluxing materials and a prefused agglomerant therefor, said fluxing materials being selected from the group consisting of silicates and oxides of calcium, magnesium, aluminum, manganese, titanium, iron, barium, chromium, and zirconium, and titanates of calcium, magnesium, aluminum, manganese, iron, barium, chromium, and zirconium, said agglomerant being a substantially anhydrous glaze composition consisting of the fusion product of silica and oxides of at least three elements selected from the group consisting of lithium, titanium, sodium, potassium, calcium, aluminum, boron and barium, said glaze composition having a fusing temperature in the range 500° C. to 700° C., and said agglomerant being present in said flux composition in a proportion of 5 to 30 parts by weight thereof.

2. A welding flux composition as defined by claim 1 in which said fluxing materials are pyrolusite and silica, said composition consisting of 50 to 80 parts by weight pyrolusite; 50 to 80 parts by weight silica; 5 to 30 parts by weight of agglomerant and up to 15 parts by weight of fluorspar.

3. A welding flux as defined by claim 2 in which said agglomerant is sodium potassium boro-silicate.

References Cited in the file of this patent

UNITED STATES PATENTS 2,544,334    Linnert _____ Mar. 6, 1951